United States Patent
Marchand et al.

(10) Patent No.: US 6,570,968 B1
(45) Date of Patent: May 27, 2003

(54) ALERT SUPPRESSION IN A TELECOMMUNICATIONS FRAUD CONTROL SYSTEM

(75) Inventors: Dean C. Marchand, Brighton, CO (US); Erin C. Jackman, Denver, CO (US)

(73) Assignee: WorldCom, Inc., Clinton, MS (US)

( * ) Notice: Subject to any disclaimer, the term of this patent is extended or adjusted under 35 U.S.C. 154(b) by 0 days.

(21) Appl. No.: 09/574,606

(22) Filed: May 22, 2000

(51) Int. Cl.[7] .............................................. H04M 15/00
(52) U.S. Cl. ............................ 379/114.14; 379/127.02; 379/145; 379/188
(58) Field of Search ........................... 379/189, 114.14, 379/114.03, 114.04, 145, 188, 201.01, 201.02, 144.03, 114.2, 114.19, 114.26, 115.01, 115.02, 127.01, 127.02; 455/410

(56) References Cited

U.S. PATENT DOCUMENTS

| | | | | |
|---|---|---|---|---|
| 5,805,686 A | * | 9/1998 | Moller et al. ............... | 379/198 |
| 5,907,602 A | * | 5/1999 | Peel et al. .................. | 379/114 |
| 5,970,129 A | * | 10/1999 | Afshar et al. ............... | 379/144 |
| 6,157,707 A | * | 12/2000 | Baulier et al. .............. | 379/189 |
| 6,163,604 A | * | 12/2000 | Baulier et al. .............. | 379/189 |
| 6,188,753 B1 | * | 2/2001 | Afshar et al. ............... | 379/114 |
| 6,208,720 B1 | * | 3/2001 | Curtis et al. ................ | 379/114 |
| 6,212,266 B1 | * | 4/2001 | Busuioc .................... | 379/189 |
| 6,327,345 B1 | * | 12/2001 | Jordan ..................... | 379/88.02 |

* cited by examiner

Primary Examiner—Rexford Barnie

(57) ABSTRACT

A method and device for suppressing threshold alerts in a telecommunication fraud control system is disclosed. Threshold alerts are generated when the count of a certain category of call exceeds a certain threshold. These counts are maintained in relation to particular accounts. A fraud analyst determines whether or not a particular account will have alert suppression enabled, based on the type of account and its history. Once alert suppression is enabled, the count is multiplied by a coefficient before determining whether to issue a threshold alert. If the multiplied count still exceeds the threshold, an alert is generated. If not, no alert is generated.

25 Claims, 4 Drawing Sheets

ALERT SUPPRESSION IN A TELECOMMUNICATIONS FRAUD CONTROL SYSTEM

BACKGROUND

1. Technological Field

The present application relates generally to fraud control in telecommunications systems and, in particular, to suppressing the generation of alerts associated with fraud control thresholds in a long distance telecommunications network.

2. Description of the Related Art

Phone fraud is an ever-increasing problem in this country. This is a greater problem for long distance carriers (also known as Inter-Exchange Carriers IXCs) rather than Local Exchange Carriers (LECs), because the costs for fraudulent long distance calls are greater than fraudulent local calls. Since most fraudulent methods target the customers of long distance carriers, the long distance carriers often assume the majority of the liability for these calls in order to maintain good relations with customers and potential customers. In order to cope with these costs, IXCs have developed various techniques of fraud control.

The techniques of fraud control have been shaped by the fraudulent methods they are designed to defeat. Simply put, the most common technique of fraud control is to detect the symptoms of fraudulent behavior. This cannot be accomplished on a per call basis, but rather on the statistical basis of network traffic flow.

For example, as shown in FIG. 1, one type of fraud is customer premise equipment (CPE) fraud, where a hacker 101 obtains access to a Private Branch Exchange (PBX) 110 and uses it to make outgoing calls. The hacker 101 calls PBX 110, and is thereby connected through LEC 105, IXC network 150, and LEC 109, to the privately-owned PBX 110. Once the hacker has electronically broken into the PBX 110, he can make outgoing calls, from PBX 110 and through IXC network 150, to any long distance destination. These fraudulent calls are often to international destinations, such as telephone 158. However, there are certain characteristics of this type of fraud. First, the hacker 101 usually needs to make repeated short calls to the PBX 110 in order to access the outside trunk line. Second, the fraudulent calls that the hacker 101 makes on the PBX 110 are often to international destinations. Third, once the hacker 101 has access to an outside trunk line on a PBX 110, the hacker 101 usually keeps the line busy for extended periods of time. Fourth, these fraudulent calls are often made during non-business hours, when it is unlikely a business PBX would be unduly busy.

As another example, the hacker 101 may illegally obtain a calling card. In this case, when the hacker 101 makes a call, it is routed through the Intelligent Services Network (ISN) platform 130 for validation, authorization, and connection. If the calling card has not been reported stolen or missing, the call would be processed through the ISN platform 130 and released to the IXC network 150. As with most fraudulent calls, it is likely that the call will terminate at a foreign destination, such as telephone 158. However, once again there are certain characteristics to this type of fraud. First, stolen calling cards are often distributed or resold to a group of people, resulting in a dramatic increase in traffic in a short amount of time on that calling card account. Second, this type of fraud may be perpetrated from certain dialing areas more than other dialing areas. In addition, as with the CPE example, the calls are often to international destinations, and last for extended periods of time.

Although the above examples are not an attempt to create an exhaustive list of the characteristics of fraudulent calling schemes, they do illustrate what an IXC must look for in order to detect fraud. Based on the above characteristics, an IXC can monitor calling patterns for particular behaviors. Below, an exemplary and simplified fraud control system is described. The described system is based upon U.S. Pat. Nos. 5,566,234, 5,596,632, and 5,805,686, which all have the same assignee as the present invention and which all are hereby incorporated by reference.

When reviewing the characteristics of fraudulent behavior described above, it is clear that a fraud control system must closely scrutinize the following calling patterns:

Inbound 800 number calls;

Outbound international calls;

Numerous short duration calls which may indicate that hackers are attempting entry;

Excessively long calls which may indicate that hackers are using inbound trunks to make outbound calls;

An unusual number of calls to foreign countries; and

An unusual number of calls during non-business hours (for accounts associated with businesses).

Furthermore, fraud may be suspected when calls originate from prisons, pay phones, hotels, hospitals, etc. Some originating regions, such as Manhattan, may become suspicious over time, if more fraudulent calls are made from that region than others. The records about such origin points may be scrutinized more carefully. For calls to specific "800" numbers or from certain Automatic Number Identifications (ANIs), the following data may be collected:

Total number of short duration calls;

Total number of long-duration calls;

Total number of calls of any type; and

Total number of cumulative minutes from any type of call.

For this type of statistical data, thresholds are established. A threshold is a number which, when exceeded, generates an alarm (or alert) indicating possible fraud. For example, the total number of short duration calls might have a threshold of 100 within a given period of time. If, within that period of time, a $101^{st}$ call is made, a threshold alert would be generated. Thresholds may be specified for different times, different days of the week, different billing categories—in fact, almost any permutation of characteristics can be used to specify a threshold.

Thresholds may also be weighted in order to indicate an increased risk associated with certain calls. When a threshold is weighted, the statistic for that call is multiplied by the assigned risk factor (any number between 1.0 and 100.0). For example, if an outbound call to Cuba is assigned a risk of 2.0, then such a call is counted twice. In this way, the threshold is exceeded more quickly. Risk factors may be assigned to calls to or from specific exchanges, specific countries, specific calling card accounts, etc. As with thresholds themselves, risk factors can be applied to any measurement of traffic characteristics.

There are various records that are used in telecommunications system management and fraud control. A "billing number"—a billing product and an account number, such as a calling card, pre-paid phone card, etc.—is used to identify a particular account. Within the network itself, detailed information in the form of a Call Detail Record (CDR) is associated with each call made. Certain components within the long distance switched network used by the IXC create and maintain the CDRs, thus allowing billing information to be tracked.

An exemplary and simplified fraud control system is shown in FIG. 2. The network 200 generates CDRs that are collected, along with billing data 210, by a billing software program 220. The billing software program 220 selects relevant CDRs to be sent to the fraud control system 250. What is considered a relevant CDR is determined by previously gathered statistics. For instance, relevant CDRs may be the CDRs associated with all non-residential inbound "800" number calls and outbound international calls. This prevents the fraud control system 250 from being overwhelmed with data. Inside the fraud control system 250, the CDR and billing data output of the billing software program 220 enters a fraud data server (FDS) 252. The FDS 252 includes a buffer for holding call records and provides call records to a Threshold Manager (TM) 254. The TM 254 processes call records by reviewing their fields and comparing their fields with the established thresholds. The TM 254 generates alarms when thresholds are exceeded, and transmits these alarms to the FDS 252. The FDS 252 subsequently produces alarm summaries and forwards them to the fraud control workstation 256.

The fraud control workstation 256 provides a graphical user interface for a fraud analyst, who analyzes alarms and general status reports. The workstation 256 has access to the call records buffered in the FDS 252, as well as to billing data and general network CDRs through the FDS 252. In this way, the fraud analyst has full access to all necessary information to make a determination concerning the occurrence of fraud. When a particular threshold alert is analyzed, the history of that billing number is reviewed in order to determine whether or not to deactivate that billing number. The fraud analyst may attempt to contact the owner of the account associated with that billing number in order to resolve the issue. If the fraud analyst decides that the calling card is being used fraudulently, he sets a "fraud flag" which indicates that subsequent calls using this billing number should be blocked or intercepted. This whole process may be automated so that a fraud analyst is not needed to actually flag a billing number.

However, there are certain accounts that produce legitimate non-fraudulent but high-volume traffic that resembles fraudulent traffic. For example, a phone sales company that is cold-calling within a certain telephone exchange will generate repeated short calls in a short duration. In the prior art, this traffic would keep setting off the threshold alarms, forcing fraud analysts to repeatedly determine whether the billing number is generating fraudulent traffic. This process wastes the fraud analysts' time as well as taking them away from analyzing genuinely fraudulent calls.

Therefore, a need exists for a system and method to reduce the alarms generated by non-fraudulent high-volume traffic.

SUMMARY

One object of this invention is to provide a system and method of reducing alarms generated by non-fraudulent traffic exceeding thresholds in a fraud control system in a telecommunications network.

Another object of this invention is to provide a system and a method for recognizing and reducing the counts of suspicious but non-fraudulent traffic in a fraud control system in a telecommunications network.

To accomplish the above and other objects, a system and method for suppressing threshold alerts in a telecommunication fraud control system is disclosed. In this system and method, it is determined whether or not a particular account will have alert suppression enabled, based on the type of account and its history. Once alert suppression is enabled, the count is multiplied by a coefficient before determining whether to issue a threshold alert. If the multiplied count exceeds the threshold, an alert is generated. If not, no alert is generated.

BRIEF DESCRIPTION OF THE FIGURES

The foregoing and other objects, aspects and advantages will be better understood from the following detailed description of a preferred embodiment as illustrated in the following drawings. In the drawings, like reference numbers indicate identical or functionally similar elements.

DETAILED DESCRIPTION OF THE PREFERRED EMBODIMENTS

In the following description, the term "network" is a short-hand description of the conglomeration of databases, trunk and telephone lines, routers, switches, protocols, and computers that are required to make a telecommunications network.

In short, the preferred embodiment allows a fraud analyst to suppress alerts for a particular account or billing number by rescoring the threshold totals. In the preferred embodiment, the rescoring coefficient is 0.3, resulting in a decrease of 0.7. In other words, if the total number of short duration calls has reached 900 for a particular account, and a fraud analyst enables alert suppression on that account, the total number of short duration calls will be rescored as 900*0.3=270. This will decrease the chance of a threshold alert being generated by the threshold manager 254.

There are two parts to alert suppression: first, the fraud analyst enables alert suppression for a particular billing number; second, the threshold monitor rescores the current counts for billing numbers which have alert suppression enabled.

Figure 1:
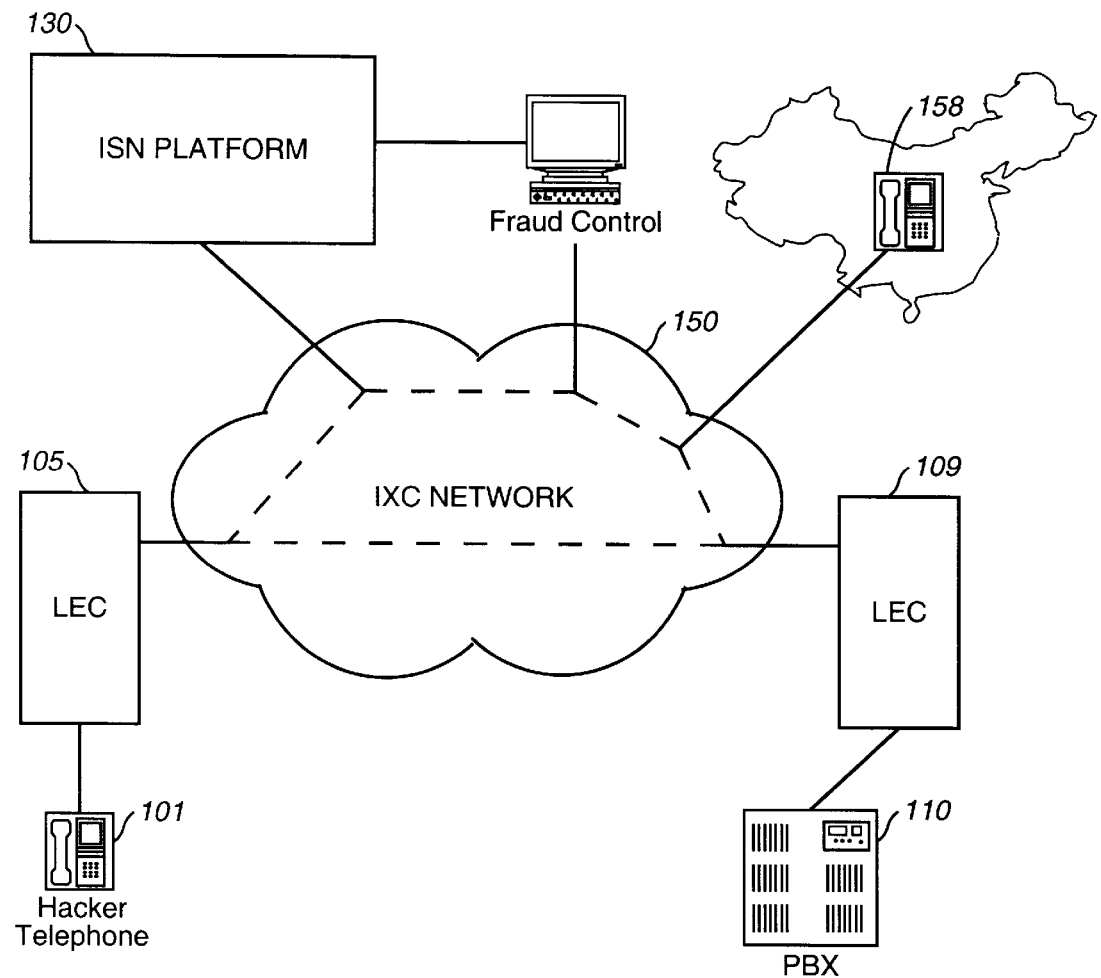
FIG. 1 is a schematic diagram of a long distance telephone system, according to the prior art.
Figure 2:
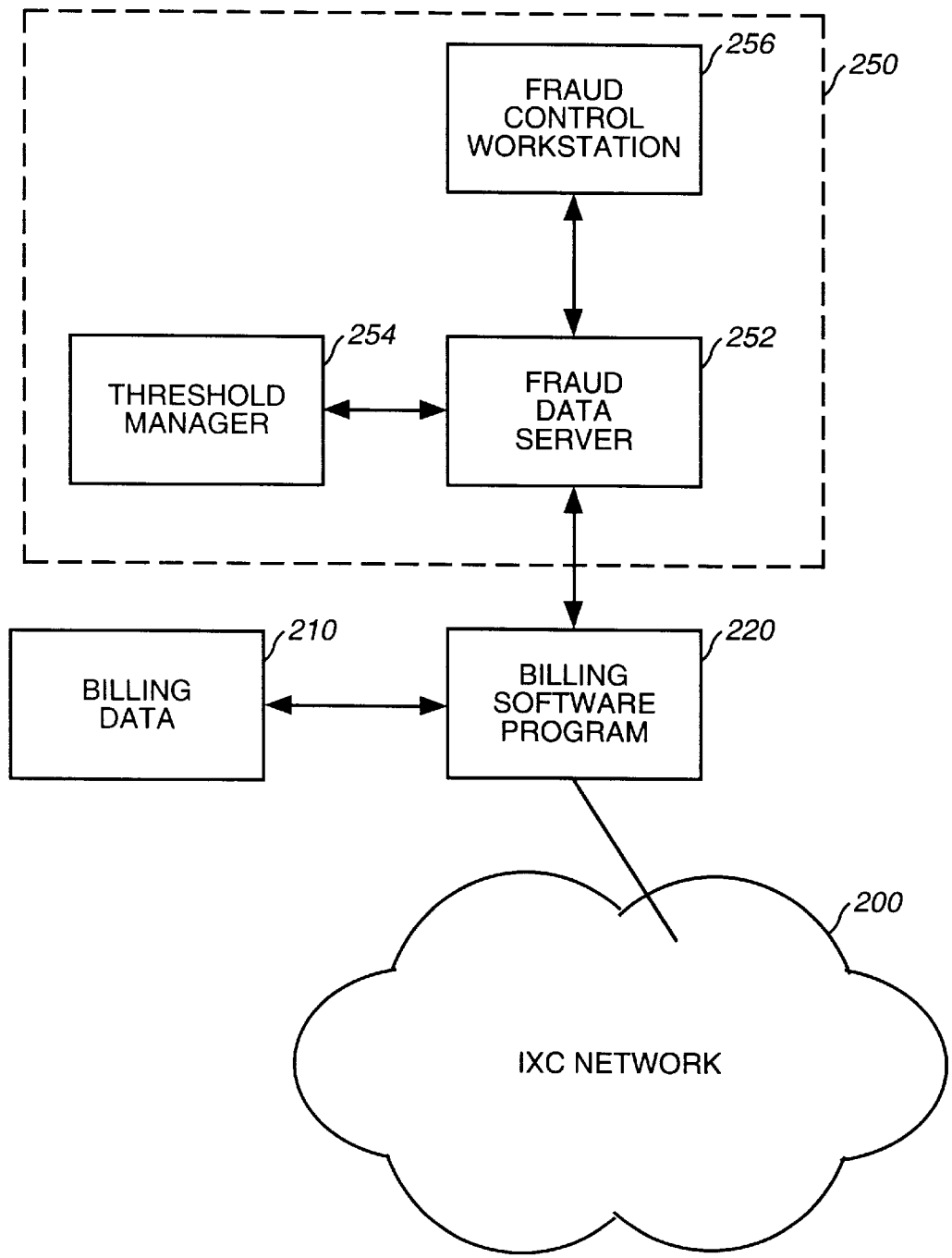
FIG. 2 is a schematic diagram of an exemplary and simplified fraud control system.
Figure 3:
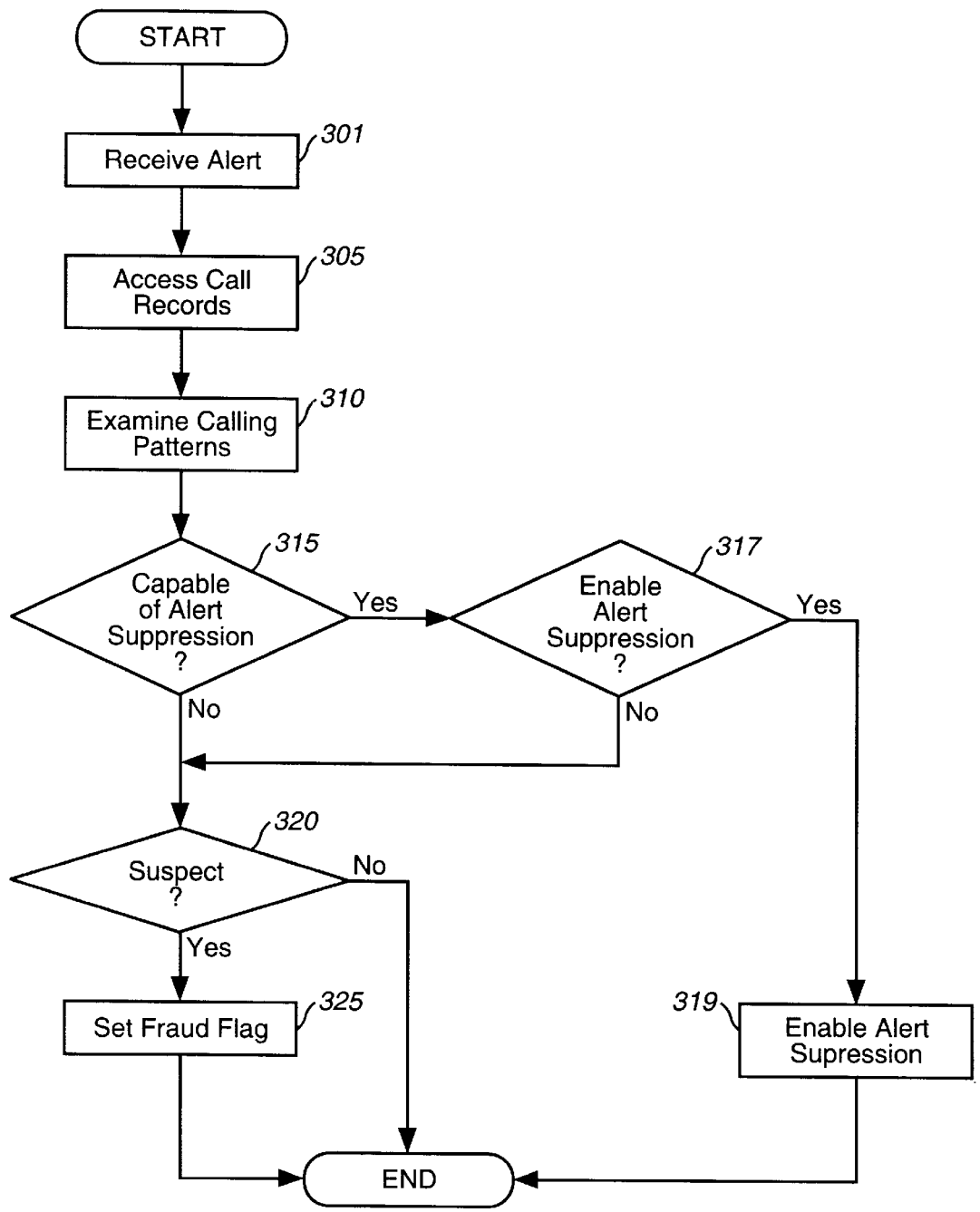
FIG. 3 is a flowchart of the alert suppression enablement procedure, according to the preferred embodiment of the present system and method.

An exemplary and simplified alert suppression enablement procedure according to the preferred embodiment of the present invention is shown in FIG. 3. Alert suppression enablement occurs in the fraud control workstation 256 of FIG. 2. In step 301 of FIG. 3, the fraud control workstation 256 receives an alert concerning a particular billing number from the FDS 252. The workstation automatically accesses the call records associated with the billing number at step 305. The fraud analyst at the workstation analyzes calling patterns and history of the billing number at step 310. In the preferred embodiment, only certain billing products, such as commercial accounts, have the capability of alert suppression. Thus, in step 315, it is determined whether this billing number has this capability. If it does, the fraud analyst may choose, in step 317, to enable alert suppression. The fraud analyst will make this decision based on the analysis made in step 310. If the fraud, analyst decides to enable alert suppression in step 317, alert suppression is enabled in step 319. If either the billing number is incapable of alert suppression in step 315, or the fraud analyst decides not to enable alert suppression in step 317, the fraud analyst determines whether the activity that set off the original alert is suspect in step 320. If the activity is suspect, a fraud flag is set in step 325. If the activity is not suspect in step 320, the process ends.

Figure 4:
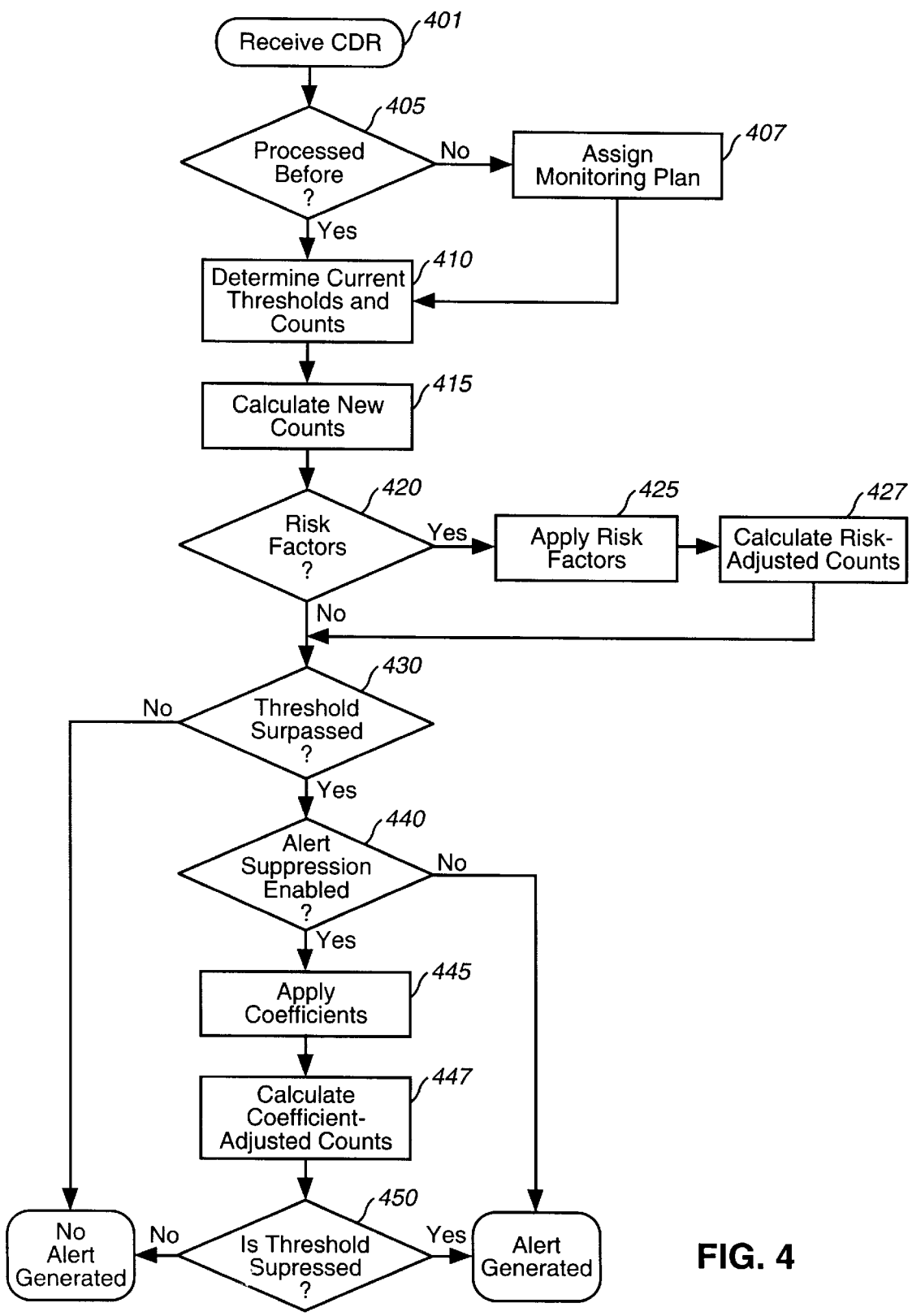
FIG. 4 is a flowchart of the call processing procedure, according to the preferred embodiment of the present system and method.

An exemplary and simplified call processing procedure, where current counts are rescored for billing numbers with alert suppression enabled according to the preferred embodiment of the present invention, is shown in FIG. 4. The call processing occurs in the threshold manager (TM) 254 of FIG. 2. After the FDS 252 forwards a relevant CDR, the TM 254 receives it in step 401. The TM 254 determines whether the billing number associated with the CDR has been processed before in step 405. If it has not been processed, the TM 254 assigns an appropriate monitoring plan to the billing number in step 407. The monitoring plan will detail the appropriate call counts, thresholds, and durations for monitoring that billing number in the future. If either the billing number has been processed before in step 405 or a monitoring plan has been assigned in step 407, the current thresholds and counts are determined in step 410. In step 415, new counts are calculated, based on the received CDR. Once the new counts are calculated in step 415, it is determined whether there are risk factors applied to any of the counts in step 420. If there are risk factors, they are applied in step 425, and the counts are recalculated in step 427. Either once the risk-adjusted counts are calculated in step 427, or when it is determined there are no risk factors in step 420, it is determined whether any thresholds have been surpassed in step 430. If no thresholds have been surpassed in step 430, the process ends and no alert is generated.

If a threshold is surpassed in step 430, it is determined whether alert suppression is enabled for the billing number in step 440. If alert suppression has not been enabled in step 440, an alert is generated and the process ends. If alert suppression has been enabled in step 440, the coefficient(s) will be applied to the current counts in step 445 and then new counts will be calculated in step 447. In step 450, it is determined whether the new coefficient-adjusted counts surpass any thresholds. If any thresholds are surpassed in step 450, an alert is generated and the process ends. If no thresholds are surpassed, the process ends without an alert being generated.

In the preferred embodiment of the present invention, the coefficient-adjusted counts are not saved, so that the original data before the coefficients were applied is saved. Risk factors are applied on a per call basis, rather than a total count basis, so the risk-adjusted counts can be saved. In the preferred embodiment, different coefficients can be applied to different counts as well as applying one overall coefficient to all counts. In another embodiment, the fraud analyst enables the suppression functionality by restarting the count. This means that steps 440–450 of FIG. 4 would not be necessary, because the fraud analyst would simply multiply the current count by 0.3, and establish that new count as the current total.

As one skilled in the relevant art would recognize, many elements of a telecommunications network have been left out as irrelevant to the preferred embodiment of the present invention. For instance, when an alert is generated after step 440 or step 450 of FIG. 4, a fraud control system would usually process the alert in order to prevent flooding the FDS 252 when a string of threshold-breaking call counts come in. These and other details have been left out in order not to obscure the invention in details unnecessary to the understanding of the present invention.

Although the above-described embodiment is the preferred embodiment, many modifications would be obvious to one skilled in the art. For instance, other configurations of the Fraud Data Server (FDS) 252, Threshold Monitor (TM) 254, and fraud control workstation 256 could be employed. In addition, an automated program could replace the decision-making process handled by a fraud analyst.

While the present invention has been described with respect to a certain preferred embodiment, it should be understood that the invention is not limited to this particular embodiment, but, on the contrary, the invention is intended to cover all modifications, equivalents, and alternatives falling within the spirit and scope of the invention as defined by the appended claims.

What is claimed is:

1. A method for suppressing fraud control threshold alerts in a telecommunications system, the method comprising:
   determining whether a customer account has enabled alert suppression when a call count exceeds a threshold; and
   if the alert suppression is enabled for the customer account, rescoring the call count and generating an alert when the rescored call count exceeds the threshold.

2. The method as recited in claim 1, further comprising:
   selecting a rescoring coefficient; and
   applying the selected rescoring coefficient to the call count.

3. The method as recited in claim 1, wherein the telecommunications system is a long distance telephone system.

4. The method according to claim 1, further comprising
   receiving an alert associated with the customer account;
   examining calling patterns and history associated with the customer account for fraudulent activity;
   determining whether to enable alert suppression based on the received alert associated with the customer account; and
   determining whether to flag the customer account for fraudulent activity.

5. The method as recited in claim 1, further comprising:
   identifying one of a plurality of categories of calls associated with the call count corresponding to the customer account; and
   if alert suppression is enabled, rescoring the call count according to the one category.

6. The method as recited in claim 5, wherein the categories of calls comprise one of:
   inbound "800" number calls;
   outbound international calls;
   numerous short duration calls;
   excessively long calls;
   an unusual number of calls to foreign countries; and
   an unusual number of calls during non-business hours for accounts associated with businesses.

7. The method as recited in claim 1, wherein said rescoring includes decreasing the call count.

8. The method as recited in claim 1, further comprising:
   processing the generated alert to prevent alert flooding, if a string of threshold breaking call counts is received.

9. The method as recited in claim 1, further comprising:
   adjusting the call count according to a risk factor.

10. A method for suppressing fraud control threshold alerts in a telecommunications system, the method comprising:

determining whether to enable alert suppression for a customer account based on a received alert associated with the customer account;

if the alert suppression is enabled for the customer account, rescoring a call count corresponding to the alert; and determining whether to flag the customer account for fraudulent activity based on a comparison of a threshold and the rescored call count.

11. The method as recited in claim 10, further comprising:

determining whether the customer account is capable of alert suppression; and enabling alert suppression if it is determined that activity which generated the alert was non-fraudulent.

12. The method as recited in claim 10, further comprising:

determining whether the customer account is exhibiting a suspicious pattern of activity; and flagging the customer account for fraudulent activity if it is determined that the customer account exhibits a suspicious pattern of activity.

13. A device for suppressing fraud control threshold alerts in a telecommunication system, comprising:

a threshold manager for:
tracking call counts corresponding to customer accounts,
determining that a particular customer account is provided with alert suppression capability when the corresponding call count exceeds a threshold, and
if the alert suppression capability for the particular customer account is enabled, rescoring the corresponding call count by applying a rescoring coefficient and generating an alert when the rescored call count exceeds the threshold.

14. A system for suppressing fraud control threshold alerts in a telecommunication system, comprising:

a fraud control system for receiving an alert associated with a customer account, for receiving calling patterns and history associated with said customer account, for enabling an alert suppression capability for the customer account, and for outputting a rescored call count by rescoring a call count corresponding to the alert if the alert suppression capability is enabled for the customer account.

15. The system as recited in claim 14, further comprising:

a workstation for displaying the received alert, calling patterns, and history.

16. The system as recited in claim 15, wherein a fraud analyst at the workstation examines the alert, the calling patterns, and the history associated with the customer account to determine whether to enable alert suppression based on the received alert.

17. The system as recited in claim 14, wherein the alert, the calling patterns, and the history associated with the customer account are examined to determine whether to enable alert suppression based on the received alert.

18. The system as recited in claim 14, wherein the rescored call count replaces the call count.

19. The system as recited in claim 14, wherein the telecommunication system is a long distance telephone system.

20. A method for supporting telecommunications fraud control, the method comprising:

associating a plurality of call counts with a plurality of call categories;

determining whether the call counts exceed respective thresholds;

rescoring the call counts according to the corresponding call categories if alert suppression is enabled for an account associated with the call counts; and generating alerts based on the rescored call counts exceeding the respective thresholds.

21. The method according to claim 20, wherein said rescoring includes applying coefficients that are particular to the respective call categories to the plurality of call counts.

22. The method according to claim 20, wherein said rescoring includes applying a coefficient to each of the plurality of call counts.

23. The method according to claim 20, further comprising:

adjusting the plurality of call counts according to risk factors.

24. A method for alerting of potential fraudulent calling activity in a telecommunications system, comprising:

calculating a call count including a number of calls associated with an account of a customer and which correspond to a category of the fraudulent calling activity;

calculating a rescored call count including reducing the call count based on a rescoring value applied to the call count, if alert suppression is enabled for the customer account and the call count exceeds a threshold; and applying the threshold to the rescored call count to determine whether to generate an alert indicating the potential fraudulent calling activity.

25. A method for generating a fraud control alert based on a threshold in a telecommunications system, comprising:

determining a call count associated with a customer account;

determining if the customer account includes alert suppression; and if the alert suppression is included in the customer account, then rescoring the call count and generating the fraud control alert if the rescored call count exceeds the threshold, and if the alert suppression is not included in the customer account, then generating the fraud control alert if the call count exceeds the threshold.

* * * * *